March 1, 1932     B. J. POVALSKI     1,847,444
ANCHORAGE FOR IDENTIFICATION PLATES
Filed April 25, 1929
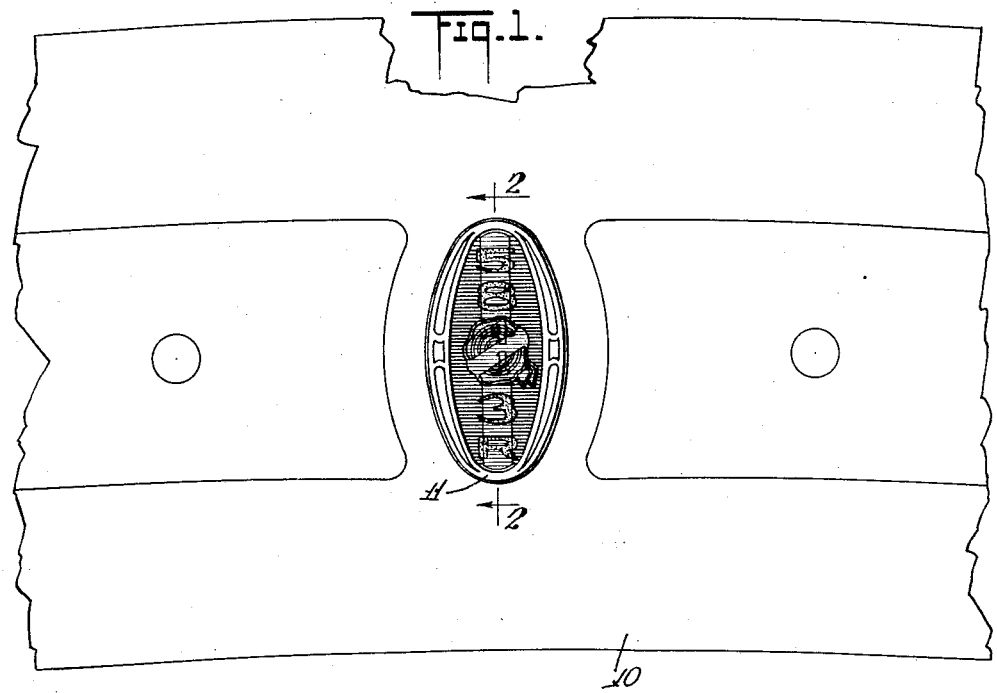
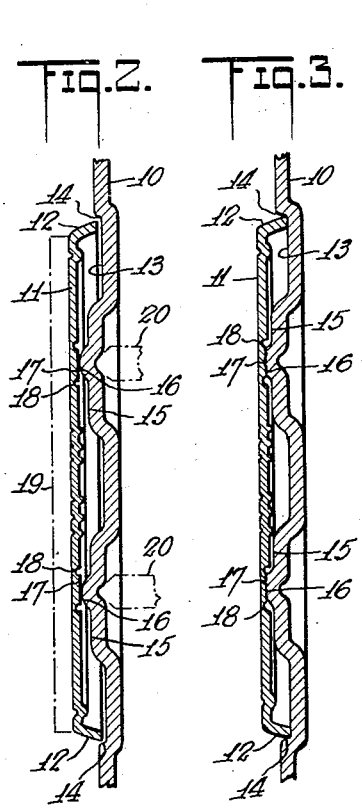
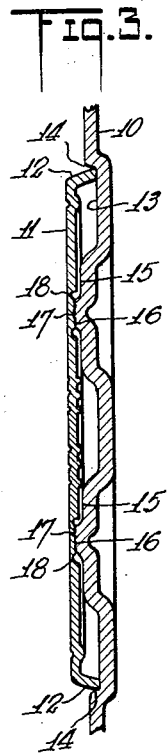
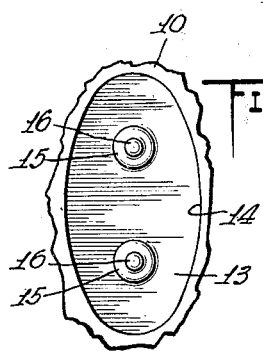
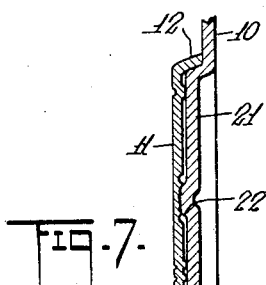
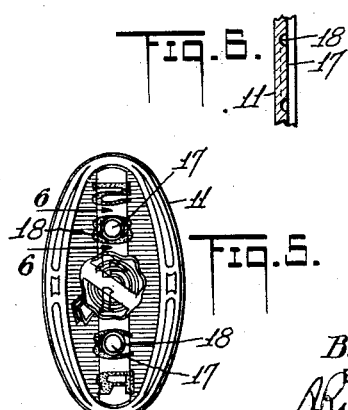
INVENTOR
Bernard J. Povalski.
BY
ATTORNEY Patented Mar. 1, 1932

1,847,444

UNITED STATES PATENT OFFICE

BERNARD J. POVALSKI, OF JERSEY CITY, NEW JERSEY, ASSIGNOR TO FEDCO SYSTEM, INC., A CORPORATION OF DELAWARE

ANCHORAGE FOR IDENTIFICATION PLATES

Application filed April 25, 1929. Serial No. 357,968.

My invention relates to a new form of anchorage and a new method of anchoring an identification plate to a suitable base. My invention is particularly adapted for attaching an identification plate to a motor vehicle. Said plate is preferably of the type described in my copending application Serial No. 357,967, filed April 25, 1929, and is adapted to protect a motor vehicle against theft. It is important that the identification plate be attached to the motor vehicle in such fashion as to prevent its removal without mutilation or destruction of the plate. It is customary to attach the plate to the instrument board of the vehicle where it will always be in plain sight not only to occupants of the vehicle but also to policemen, detectives, and the general public. Because of such conspicuous location the absence of a plate from an automobile will be readily noted and any tampering with the plate may be readily detected.

In the case of identification plates of relatively thick cross section it has been the practice to cut deeply into the under-face of the plate to form an annular flange adapted to cooperate with an anchorage device. The anchorage provided for in the present application is of a character suited particularly to an identification plate of metal on which it would be commercially impracticable to form an annular flange of the size and depth requisite to cooperate with the anchorage device disclosed in said patent. An object therefore of the present invention is to provide an improved anchorage for an identification plate made of a relatively thin shell of metal.

More specifically, an object of the invention is to provide a means for and method of anchoring such identification plates by spot welding to a suitable base.

Another object is to provide means for locating the welding points on the plate in register with the corresponding welding points or bosses on the base.

Another object of the invention is to provide an attractive setting for the plate which will serve also as a locating means therefor, on the base. With these objects in view and others which will appear hereinafter, I shall now describe a preferred embodiment of my invention and also a modification thereof, and therefore the novelty and scope of the invention will be pointed out in the claims.

In the accompanying drawings:

Figure 1 is a front elevation of a portion of an instrument board with my improved identification plate mounted thereon.

Fig. 2 is a view on an enlarged scale and in vertical section through the plate and instrument board, showing the relative position of the two parts immediately prior to the welding operation, the section being taken on the line 2—2 of Fig. 1.

Fig. 3 is a view similar to Fig. 2, showing the plate after it has been welded to the base.

Fig. 4 is a fragmentary view of the instrument board, showing a socket formed therein to receive the plate.

Fig. 5 is a view of the reverse side of the plate, showing particularly the welding points on the plate with an annular weakened area about each of said points.

Fig. 6 is a view in section through one of the welding points, the section being taken on line 6—6 of Fig. 5, and Fig. 7 is a view in section similar to Fig. 2 but showing a modified form of base with a centering pad instead of a socket to position the plate.

In the drawings I have used the reference numeral 10 to indicate an instrument board or other suitable base on which an identification plate 11 is secured. The latter is in the form of a thin shell of metal embossed or otherwise provided with identifying indicia. The plate may be of any suitable form and is here shown as an oval. It will be observed from the sectional views, Figs. 2 and 3 that the shell is cupped, being provided with a down-turned rim 12 which, when the plate is attached to the instrument board, gives it the appearance of a plate of thick section.

The instrument board 10 is formed with a socket 13 of marginal outline similar to that of the plate. The socket is of such a size that the plate will fit closely therein so that the shoulder or wall 14 defining the socket will conceal the joint between the rim 12 and the board and protect the rim from being intentionally or inadvertently pried from its support.

Within the socket the board 10 is formed with a pair of pads 15 provided with welding bosses 16. The plate is formed on the reverse side with a pair of welding points 17 adapted to be welded to the bosses 16. The welding points preferably do not project from the general plane of the under face of the plate but are set off therefrom by annular depressions or grooves 18. These grooves are preferably formed by a punch or by an insert in a male embossing die without corresponding depression in the female die when the plate is formed. Thus the metal is reduced in thickness around each weld point 17, forming a region of weakness, but the grooves 18 will not show through on the obverse face of the plate. The weld points 17 are preferably located under important characters or features of the design on the plate, so that if anyone should attempt to pull the plate off, the plate would tear along the grooves 18, leaving conspicuous holes in the plate where it would be impossible to repair the plate without leaving tell-tale marks thereon.

The socket 13, in the base, serves to position the plate, so that the weld points 17 will be located in register with the weld bosses 16. The height of the bosses is such that the rim 12 will be slightly spaced from the bottom of the socket when the weld points 17 touch the bosses 16. However, when the parts are fused together the rim 12 will be seated tightly against the bottom of the socket, as shown in Fig. 3.

The welding is accomplished by placing a broad electrode against the face of the plate, as indicated in broken lines at 19 in Fig. 2, and a pair of opposed electrodes, as indicated in broken lines at 20, against the reverse side of the base directly under the bosses 16. By using a broad electrode against the plate the design on the plate is protected from damage. The recess or socket 13 in the instrument board serves to provide an ornamental setting for the plate, as well as to protect the edge of the plate from being pulled off.

The anchorage shown in Fig. 7 differs from that described above principally in the fact that the plate, instead of being fitted into a recess, is fitted over a pad 21. The latter is embossed upon the instrument board and is provided with a pair of bosses 22 which correspond to the bosses 16 previously described. The pad 21 is of a size to closely fit the rim 12 on the plate, so that it serves to position the weld points 17 on the bosses 22. The method of welding the plate to these bosses is the same as that described above.

Having thus described my invention, what I claim as new and desire to protect by Letters Patent is:

1. In combination, an identification plate formed with a down-turned marginal rim, and a base formed with a seat to fit said rim, the base being also formed with a boss to which the plate is spot welded, and the plate having a line of weakness formed therein about the welded spot.

2. In combination, an identification plate formed with a down-turned marginal rim, and a base formed with a recess to receive said rim, the base being also formed with a boss to which the plate is spot welded, and the plate having a line of weakness formed therein about the welded spot.

3. In combination, an identification plate provided on its under face with a weld surface, and a base provided with a boss to which said surface is welded, the plate being formed with a down-turned rim contacting with the base, and the base being formed with a shoulder to conceal the line of contact of the rim on the boss.

4. In combination, an identification plate formed with an impressed groove in its reverse face, and a base formed with a recess to receive the plate and with a boss adapted to be spot welded to the reverse face of the plate within said groove, the plate being also formed with a down-turned marginal flange engaging the base.

5. The combination with an identification plate having a weld surface on the reverse face thereof, of a base plate formed with a boss to which said surface may be welded, the base plate also having a seat adapted to fit the plate and bring said weld surface into registry with the boss.

6. The combination with an identification plate having a weld surface on its reverse face and a down-turned marginal rim, of a base plate formed with a recess to receive said rim and with a boss to which said surface may be welded, the recess serving to locate the plate so as to bring said surface into registry with said boss, the boss being of such height that when the identification plate has been welded thereon the rim of the plate will engage the bottom of said recess.

In testimony whereof, I have signed this specification.

BERNARD J. POVALSKI.